Sept. 18, 1956  M. KADOSCH ET AL  2,763,125
MEANS FOR CONTROLLING THE DIRECTION
OF A STREAM OF IONIZED FLUID
Filed April 3, 1952  3 Sheets-Sheet 1
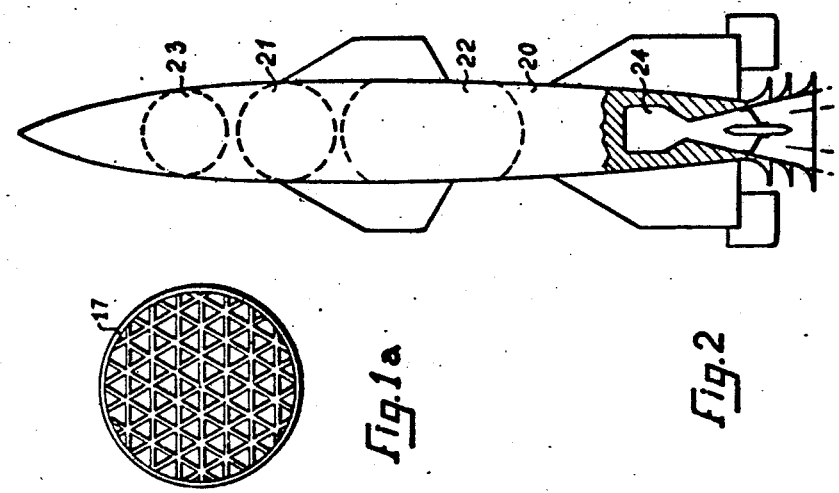
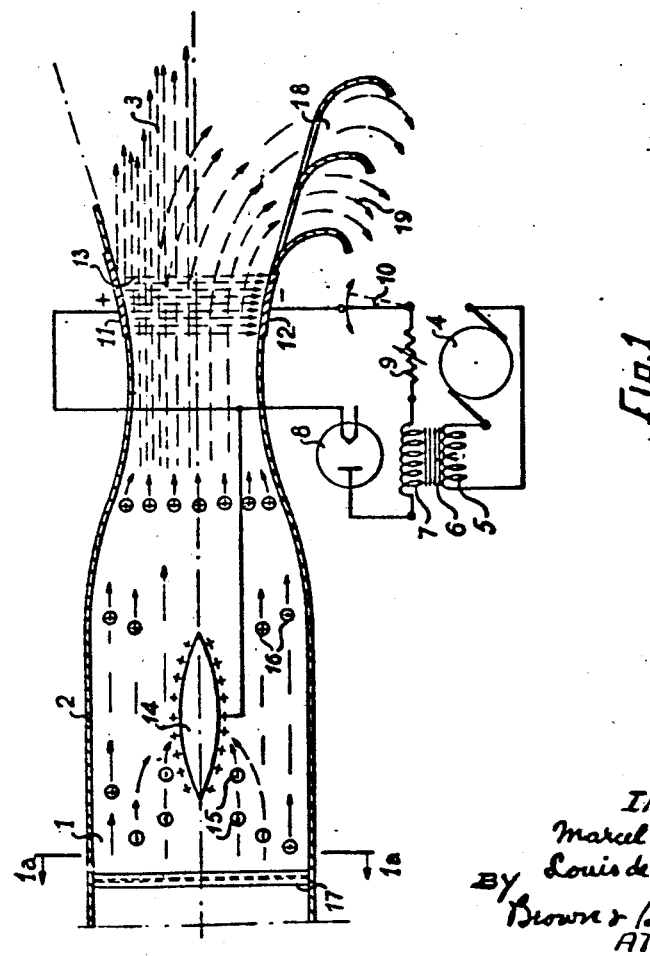
INVENTORS
Marcel Kadosch
Louis de Jurquet de la Salle
BY Brown & Seward
ATTORNEYS

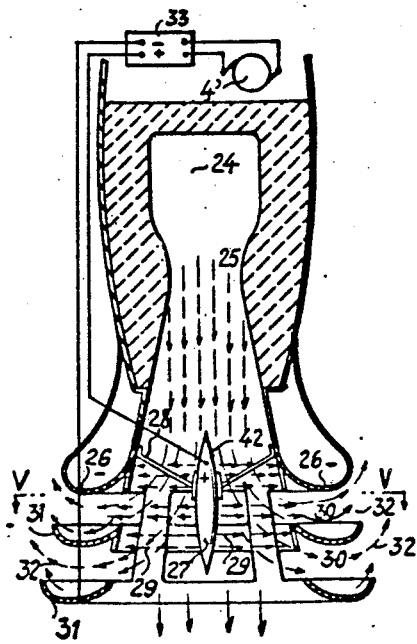
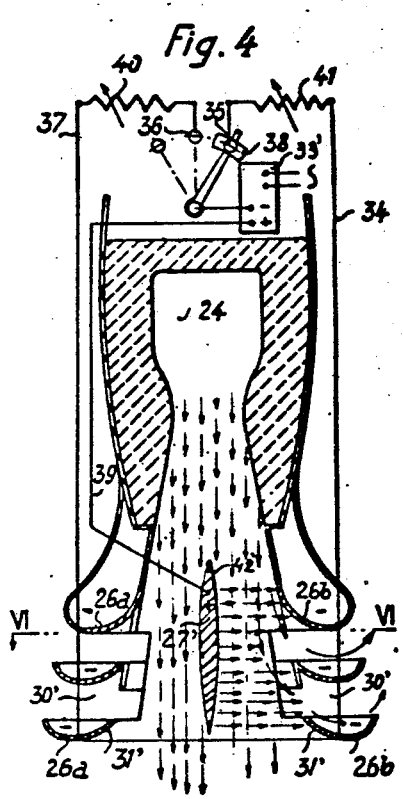
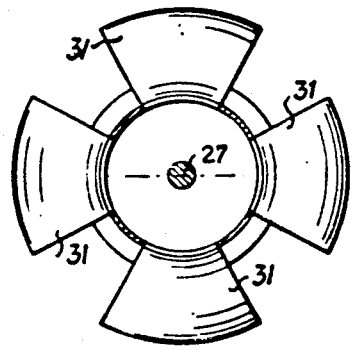

Sept. 18, 1956  M. KADOSCH ET AL  2,763,125
MEANS FOR CONTROLLING THE DIRECTION
OF A STREAM OF IONIZED FLUID
Filed April 3, 1952  3 Sheets-Sheet 3

INVENTORS
Marcel Kadosch
Louis de Gurgait de la Salle
BY Brown & Seward
ATTORNEYS

United States Patent Office 2,763,125
Patented Sept. 18, 1956

2,763,125

MEANS FOR CONTROLLING THE DIRECTION OF A STREAM OF IONIZED FLUID

Marcel Kadosch and Louis de Jarquet de la Salle, Paris, France

Application April 3, 1952, Serial No. 280,436

Claims priority, application France April 5, 1951

4 Claims. (Cl. 60—35.54)

This invention relates to means for deviating from its normal path a stream of at least partially ionized fluid of high temperature and, more especially, the ionized jet escaping from the nozzle of a jet power unit.

In this specification and in the appended claims, the term "fluid" is intended to cover any material having a flowing-power, such as a gas, a vapor, a liquid or, more generally, a system of molecules non-rigidly fast with one another, or again of molecule portions such as flows of atom nuclei, or nucleus portions, resulting from nuclear fragmentation or nuclear budding.

The jets escaping from air-consuming and other jet power units are usually generated through thermal and chemical reactions such as combustion, which generally result in a partial dissociation of the reaction products into electrically loaded or ionized particles. Said dissociation is a function of the temperature and is present to a notable degree in the gases escaping from rockets, and rocket motors. Should nuclear energy be resorted to for powering rocket motors, the products of the nuclear reaction also contain particles variously loaded electrically.

One object of the invention is to submit the stream of ionized gaseous fluid, the direction of which is to be controlled, to the action of at least one electric or/and magnetic field having a component right-angled to the normal direction of flow of said stream and adapted to exert, upon the ionized particles thereof, forces capable of changing the path of said particles against the forces such as inertia which tend to maintain said particles in their normal path.

Another object of the invention is to provide, in and for a device in which a stream of ionized gaseous fluid at high temperature is guided along a portion of its path, means to generate across the path of said stream an electric or/and magnetic field of the type described.

Still another object of the invention is to provide means for adjusting the intensity of said field component to thereby vary the angle of deviation of the stream.

Now, if the degree of ionization of the fluid is too weak to be usefully acted upon, e. g., in the case of certain jet engines, in the actual state of the art, the application of the direction controlling method according to the invention requires an artificial increase of said degree of ionization.

Another object of the invention is to provide, upstream the active area of the above described deviation field, means to increase the degree of ionization of the fluid stream the direction of which is to be controlled.

A further object of the invention is to include in the means provided for generating the desired field or fields, an electrode provided with at least one point so as to produce in the flow a stationary aerodynamic shock wave and so that the action of the aerodynamic shock adds with the electrostatic ionizing power of said point to increase the degree of ionization of the fluid.

On the other hand, the particles of the stream may be positively or negatively loaded, or both. It may be preferable, in certain cases, to eliminate the particles of a given polarity.

A further object of the invention is to provide, upstream the above mentioned field active area, a particle trap adapted to retain the particles of a given polarity.

Still a further object of the invention is to provide in and for a jet power unit, the combination of electric or/and magnetic deviating means of the type described, with mechanical deflecting means having normally no action upon said jet and into which said deviating field is adapted to direct at least a portion of the jet, said mechanical deflecting means being capable, thereupon, of deviating said jet portion by such an angle as to generate a thrust component in a direction opposite to the normal thrust direction of the jet.

Another object of the invention is to provide a combination as described in the preceding paragraph in which said electric or/and magnetic deviating means include means to generate two electric fields symmetric with respect to a given axial plane of the nozzle, and means to adjust the intensity of at least one of said fields so as to obtain a transverse component of the jet thrust of variable intensity and/or direction in a plane normal to the axis of the jet.

Accessorily, there may be provided means to prevent any objectionable action of aerodynamic forces on said mechanical deflecting means.

The invention offers the essential advantage of requiring no obstacle in the jet to deviate the same. When the device comprises one or more electrodes within the jet, said electrode or electrodes which have no mechanical deviating function may be given a streamlined shape so as to offer practically no parasitic drag.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 1 illustrates diagrammatically the principle of the stream deviating method according to the invention.

Fig. 1a is an elevational view along the line 1a—1a of Fig. 1.

Fig. 2 is a diagrammatical axial sectional view of a thermo-propelling rocket provided with a jet direction controlling device according to the invention.

Fig. 3 is an axial sectional enlarged view of a jet direction controlling device according to the invention used in a thermo-propelling rocket such as shown in Fig. 2.

Fig. 4 is a view corresponding to Fig. 3, but showing another embodiment of the jet direction controlling device according to the invention.

Fig. 5 is a sectional view along line V—V of Fig. 3.

Fig. 6 is a sectional view along line VI—VI of Fig. 4.

Figure 7:
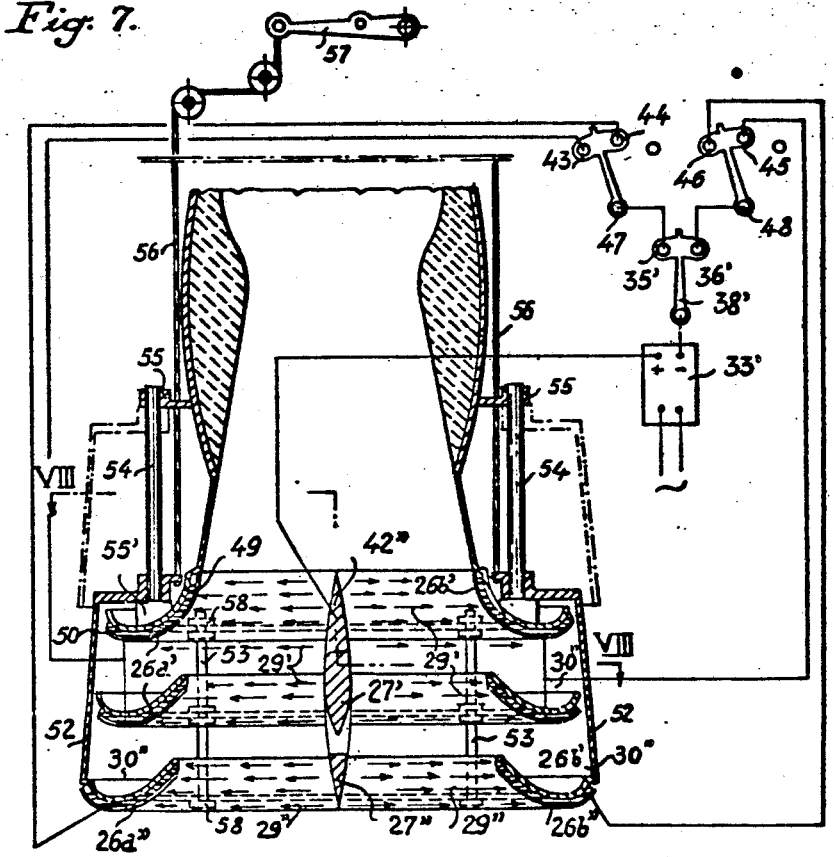
Fig. 7 is an enlarged view of another embodiment comprising two stages of electric fields and means for obturating the deflecting passages.

According to the invention, as illustrated in Fig. 1, a stream of ionized gaseous fluid 1 comprising positively and negatively loaded particles, as shown, is guided through a duct 2 along a portion of its path. Normally, i. e., when the direction controlling device according to the invention is at rest, said stream, for given constant conditions of flow, leaves duct 2, along a well-defined direction, as shown at 3.

In the example shown in Fig. 1, the direction controlling device according to the invention comprises a source of alternating current 4 feeding the primary winding 5 of a step-up transformer 6, the secondary winding 7 of which feeds a circuit comprising a rectifying diode 8, a rheostat 9, a switch 10 and a system of two electrodes, viz., a positively loaded electrode 11 and a negatively loaded electrode 12. A strong unidirectional electric field 13 is thus generated between electrodes 11 and 12 across the stream of ionized fluid. The rheostat 9 permits adjusting the intensity of the electric field 13, while the switch 10 permits cutting off said electric field.

In operation, the electric field 13 acts upon each ionized particle of the stream and exerts thereupon a force having a component right-angled to the normal direction of flow of the stream, thus generating in the stream proper a velocity component right-angled to the normal one. In the example shown in Fig. 1, substantially all particles submitted to field 13 are positively loaded, as explained hereunder, so that said particles are attracted towards the negatively loaded electrode 12. By actuating rheostat 9, it is possible to vary the intensity of the electric field and, thus, the intensity of the component acting upon the positively loaded ionized particles, which permits varying the angle between the normal direction 3 in which the stream flows when the device is at rest and the modified direction resulting from the action of said device.

In the example shown in Fig. 1, the stream 1 comprises, as indicated above, particles of both polarities. To obtain a stream essentially comprising only positive particles, a negative particle trap 14 is interposed in duct 2 upstream the active area of the direction controlling device. Said particle trap is constituted, as shown, by a positively loaded element 14, e. g., connected with the positive electrode 11. This positively loaded element attracts the negatively loaded particles 15 which are thus retained, so that, downstream of the trap, the fluid practically comprises only positive particles 16. If required, an insulating layer (not shown) may be provided on the inner wall of duct 2 opposite trap 14 to prevent the positive particles 16 from being attracted by said wall.

On the other hand, if the stream is insufficiently ionized to be successfully acted upon by the electric field 13, it is possible to provide means to increase the degree of ionization of said stream.

In the example shown in Fig. 1 said means are constituted by a grid 17 covered with a layer of thorium salts.

It is clear that the grid 17 provided to increase the degree of ionization of the stream and the particle trap 14 provided to eliminate particles of one polarity may be used either separately or in combination.

With the device so far described, the angle between the normal direction of flow 3 and the modified direction resulting from the action of the directing device may be varied from zero to a certain value lower than 90° and depending upon the degree of ionization of the fluid and the intensity of the field. This value may be sufficient, in certain cases. However, it may be interesting, e. g., for braking purposes, when the invention is applied to jet power units, to obtain a greater deviation, e. g., by more than 90°.

For this purpose, the invention also provides mechanical deflecting means, such as passages 18 which are located outside of stream 3, when the same flows in its normal direction or when the above mentioned angle between the normal and modified directions is less than a given value. However, when said angle reaches said given value, the peripherical portion of the stream is brought into passages 18 and, then, deflected as shown at 19.

In these conditions, if the outlets of passages 18 are oriented in a direction making an angle higher than 90° with the normal direction 3 of the stream, the portion of the stream engaged in passages 18, when escaping through said outlets, will exert a thrust component in a direction opposite to said direction 3.

In Fig. 2 is diagrammatically shown a rocket 20 propelled by ejection of the gaseous mixture of a fuel stocked in a container 21 and a combustive stocked in a container 22, the feeding pressure being provided by compressed air or gas, from a container 23. The mixture is burnt in a combustion chamber 24. Said combustion gives rise, as explained above, to a strong ionization of the gases resulting therefrom.

Fig. 3 shows a rocket nozzle provided with a jet direction controlling device according to the invention and which may be, e. g., used in a rocket as shown in Fig. 2. In this embodiment, the electric field according to the invention is generated between a positively loaded electrode 27 having the shape of a body of revolution and mounted axially in the nozzle on any suitable supports, such as 28, and a negatively loaded circular electrode 26.

In these conditions, the lines of forces of the electric field extend radially as shown at 29, so that the jet can be flared out to be at least partially directed into deflecting passages 30 through which it is then ejected as shown at 32, which permits braking the rocket. Electrodes 27—26 are fed with high voltage direct current from a block 33 which may include, e. g., the same circuit elements as described with reference to Fig. 1, the alternating current source being shown at 4'.

In the embodiment of Fig. 4, which may be also used in a rocket such as that of Fig. 2, the positive electrode is designed in the shape of a partition 27' extending in an axial plane of the nozzle and secured on the nozzle inner wall and there are provided two negative electrodes 26a—26b symmetrically disposed with respect to said axial plane. Electrode 26b is connected through a conductor 34 with a fixed contact 35 of a reversing switch, the other fixed contact 36 of which is connected through a conductor 37 to the other negative electrode 26a. The movable contact 38 of the reversing switch is connected with the negative terminal of a high voltage direct current feeding block 33' which may be, for example, the same as in Fig. 3, and the positive terminal of which is connected through a conductor 39 to the positive electrode 27'. It will be noted that the movable contact 38 has such a size that it may be brought into contact simultaneously with both fixed contacts 35 and 36 of the reversing switch, so that the negative electrodes 26a—26b may be fed at will selectively or simultaneously, which permits deviating the jet on either side of the normal direction or simultaneously on both sides thereof. In this embodiment, the mechanical deflecting means are constituted by several stages of passages 30' also arranged symmetrically with respect to the partition electrode 27'. Moreover, in the example shown in Fig. 4, potentiometers 40, 41 are interposed in conductors 37, 34, respectively, which permits adjusting separately the intensity of the two symmetrical fields.

With this arrangement, it is possible to obtain a directional effect, e. g., by having a stronger braking component on one side of the rocket.

In the embodiment shown in Fig. 7, the positive electrode comprises two insulated partition sections 27' and 27", the first section 27' cooperating with a first stage of negative electrodes 26a'—26b' symmetrically arranged with respect thereto. Similarly, the second section 27" of the positive electrode cooperates with a second stage of negative electrodes 26a"—26b" symmetrically arranged with respect thereto. There are thus provided two separate pairs of symmetric fields 29', 29". Any combination of the two stages and of the two fields of each stage may be provided. In the example shown, the negative electrodes 26a' and 26a" are connected respectively with two fixed contacts 43, 44 of a two-pole two-way switch, while the other negative electrodes 26b'—26b" are connected with the other fixed contacts 45—46 of said switch, the movable contacts 47—48 of the latter being connected with any selective feeding means fed from high voltage direct current such as, e. g., the fixed contacts 35', 36' respectively of a one-pole two-way switch similar to that of Fig. 4, the movable contact 38' of which is fed from the negative terminal of a high voltage direct current feeding block 33' which may be again similar to that of Fig. 1 and the positive terminal of which is fixedly connected with positive electrode 27', 27". It is clear that potentiometers may be interposed as previously in the various circuits of the electrodes. It is to be noted that all movable contacts are sufficiently wide to cover simultaneously, if desired, the fixed contacts associated therewith which permits providing any desired combination of the electric fields. Each negative electrode, such as 26a', is carried by a metallic supporting blade such as 49, a layer of a suitable insulating material, such as 50, being interposed between said electrode and said supporting blade. The rows of blades may be secured on the nozzle by any suitable means. In the example shown in Fig. 7, said securing means are constituted by a plurality of tie-rods 53 co-operating with nuts 58.

As mentioned in the preamble, the device according to the invention, when comprising deflecting passages, is preferably completed by means to avoid any objectionable aerodynamic action on said passages when the jet does not issue therethrough.

As shown in Fig. 7, said means may be constituted, e. g., by a skirt 52 having a conical shape adapted to that of the outer periphery of the above described rows of blades, so that, in the position shown in the drawing, said skirt obturates the passages between said blades. Skirt 52 is slidably mounted, in the example shown, on rods 54 secured, at one end, on the outer wall of the nozzle, as shown at 55, and, at their other end, as shown at 55', on the first row of blades, upstream. Skirt 52 is brought into and out of the closing position shown in the drawing by any suitable control means which have been diagrammatically shown in the form of cables 56 connected with a manually controllable lever 57.

In the examples shown in Figs. 3 to 8, the positive electrode offers a point 42 (42'—42") which has an electrostatic ionizing power which is still enhanced by the aerodynamic shock effect due to the stabilization on said point of the shock waves generated by the penetration of the jet into passages 30 (30'—30").

Figure 8:
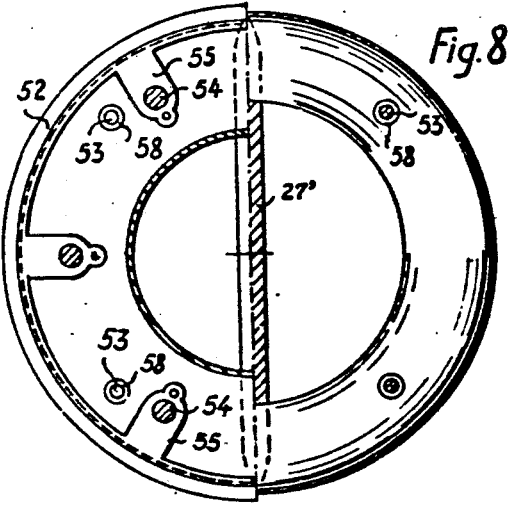
Fig. 8 is a sectional view along line VIII—VIII of Fig. 7.

All control and adjusting means such as switches 35, 36, 38, and potentiometers 40, 41 provided in the embodiments of Figs. 3 and 4 and the control lever 57, as well as the switches provided in the embodiment of Figs. 7 and 8, may be incorporated in any known system used for remotely-controlling aircraft.

It is to be understood that the invention is in no way limited to the above described embodiments, minor modifications to the embodiments shown, as well as other embodiments, being possible within the scope of the invention.

In particular, while the invention has been shown as applied to rockets comprising a diverging nozzle, it is possible to use the process and the device according to the invention in any jet power unit. In the case when the nozzle of such unit does not comprise a diverging portion, the only modification to make for using the device according to the invention will consist in providing downstream said nozzle a diverging edge such as usually provided in any deflecting method.

On the other hand, it is to be understood that, in certain cases, the electrodes shown in the embodiments described, may be substituted for by electromagnetic coils so as to provide at least one magnetic field instead of electric field or fields.

What is claimed is:

1. The combination with a reaction jet tube for aircraft adapted to discharge a gaseous fluid propulsion stream at least partially ionized by thermal action, said tube having an outlet portion of increasing cross-sectional area provided with at least one aperture so located as to lie outside the boundary of said stream as long as the same flows in the normal direction, of a deflecting device comprising an electrode located on the inner wall of said tube adjacent said aperture, means imposing a negative charge on said electrode, a positively charged streamlined electrode mounted centrally in said tube so as to provide, with said first-named electrode, an electrostatic field having a potential gradient transverse to said ionized stream, whereby the ions are attracted by the electrode of opposite polarity and the heavier positive ions accelerated towards the first mentioned electrode to cause at least a portion of said stream to deviate in a direction to pass through said aperture, and a deflecting member located outside said tube aft of said aperture to deflect the stream portion passing through said aperture into the direction of progress of the aircraft to thereby produce a steering or braking reaction.

2. The combination as claimed in claim 1, wherein means are provided for additionally ionizing said gaseous fluid stream, said means comprising a grid mounted transversely in said tube upstream said electrodes and covered with a layer of radio-active material.

3. The combination as claimed in claim 1, wherein a skirt member is slidably mounted on said tube for shrouding said aperture and thereby suppressing disturbance of the external air-flow past said aperture when the deflecting device is inoperative.

4. The combination as claimed in claim 1, wherein a further positively charged electrode is mounted on the inner wall of said tube diametrically opposite said negatively charged electrode, said streamlined electrode being located upstream said electrostatic field to physically collect the ions of negative polarity so that only positive ions will be subjected to the effect of the electric field between the two peripheral electrodes.

References Cited in the file of this patent

UNITED STATES PATENTS

| 2,281,638 | Sukumlyn | May 5, 1942 |
| 2,510,506 | Lindhagen et al. | June 6, 1950 |
| 2,525,919 | Loughren | Oct. 17, 1950 |
| 2,594,777 | Hicks | Apr. 29, 1952 |
| 2,620,623 | Imbert | Dec. 9, 1952 |
| 2,640,158 | Hicks | May 26, 1953 |

FOREIGN PATENTS

| 669,687 | Germany | Jan. 2, 1939 |